(12) United States Patent
Kim et al.

(10) Patent No.: US 10,363,900 B2
(45) Date of Patent: Jul. 30, 2019

(54) FRONT AIRBAG FOR VEHICLES

(71) Applicants: Hyundai Motor Company, Seoul (KR); Kia Motors Corp., Seoul (KR); Autoliv Development AB, Vargarda (SE)

(72) Inventors: Beom Soo Kim, Seoul (KR); Seung Ho An, Seoul (KR); Taeg Young Ahn, Suwon-si (KR); Jun Yong Min, Seongnam-si (KR); Sung Woo Lee, Hwaseong-si (KR); Dong Young Kim, Hwaseong-si (KR)

(73) Assignees: Hyundai Motor Company, Seoul (KR); Kia Motors Corp., Seoul (KR); Autoliv Development AB, Vargarda (SE)

( * ) Notice: Subject to any disclaimer, the term of this patent is extended or adjusted under 35 U.S.C. 154(b) by 69 days.

(21) Appl. No.: 15/690,650

(22) Filed: Aug. 30, 2017

(65) Prior Publication Data

US 2018/0170302 A1    Jun. 21, 2018

(30) Foreign Application Priority Data

Dec. 19, 2016   (KR) .......................... 10-2016-0173262

(51) Int. Cl.
| | |
|---|---|
| *B60R 21/2338* | (2011.01) |
| *B60R 21/203* | (2006.01) |
| *B60R 21/01* | (2006.01) |
| *B60R 21/00* | (2006.01) |

(52) U.S. Cl.
CPC .......... *B60R 21/2338* (2013.01); *B60R 21/01* (2013.01); *B60R 21/203* (2013.01); *B60R 2021/0009* (2013.01); *B60R 2021/0044* (2013.01); *B60R 2021/0048* (2013.01); *B60R 2021/01265* (2013.01);
(Continued)

(58) Field of Classification Search
CPC .............. B60R 21/2338; B60R 21/203; B60R 2021/23382; B60R 2021/0044; B60R 2021/23384; B60R 2021/0048; B60R 2021/0009
See application file for complete search history.

(56) References Cited

U.S. PATENT DOCUMENTS

| | | | | |
|---|---|---|---|---|
| 7,131,664 | B1* | 11/2006 | Pang ..................... | B60R 21/233 280/743.2 |
| 8,899,618 | B2* | 12/2014 | Eckert ................... | B60R 21/203 280/731 |
| 9,623,831 | B1* | 4/2017 | Deng .................... | B60R 21/239 |

(Continued)

*Primary Examiner* — Karen Beck
(74) *Attorney, Agent, or Firm* — Morgan, Lewis & Bockius LLP

(57) ABSTRACT

A front airbag for vehicles including an airbag cushion may include a rear panel located at the side of a steering wheel and a front panel located at the side of a passenger and having a shape corresponding to the shape of the rear panel, the rear panel and the front panel provided with protruding supports formed at both sides of the lower end portions thereof, a first tether connecting the central part of the front panel, corresponding to a loading position of the passenger's head, to an airbag housing, and second tethers connecting the lower end portion of the front panel, corresponding to a loading position of the passenger's chest, to the airbag housing and having a shorter length than that of the first tether.

7 Claims, 6 Drawing Sheets

(52) U.S. Cl.
CPC ............... *B60R 2021/01286* (2013.01); *B60R 2021/23382* (2013.01); *B60R 2021/23384* (2013.01)

(56) References Cited

U.S. PATENT DOCUMENTS

| | | | |
|---|---|---|---|
| 10,059,299 B2* | 8/2018 | Yamada | B60R 21/205 |
| 2006/0290117 A1* | 12/2006 | Fischer | B60R 21/2338 |
| | | | 280/739 |
| 2010/0171295 A1* | 7/2010 | Koh | B60R 21/2334 |
| | | | 280/743.2 |
| 2012/0242069 A1 | 9/2012 | Parks et al. | |
| 2013/0001934 A1* | 1/2013 | Nagasawa | B60R 21/233 |
| | | | 280/731 |
| 2013/0093171 A1* | 4/2013 | Eckert | B60R 21/203 |
| | | | 280/743.2 |
| 2015/0321636 A1* | 11/2015 | Jang | B60R 21/233 |
| | | | 280/743.2 |
| 2017/0166159 A1* | 6/2017 | Shin | B60R 21/2176 |
| 2017/0320460 A1* | 11/2017 | Roychoudhury | B60R 21/239 |
| 2017/0355345 A1* | 12/2017 | Moritani | B60R 21/233 |
| 2018/0065590 A1* | 3/2018 | Jindal | B60R 21/231 |
| 2018/0111581 A1* | 4/2018 | Wang | B60R 21/231 |
| 2018/0162312 A1* | 6/2018 | Faruque | B60R 21/239 |
| 2018/0201222 A1* | 7/2018 | Gandhi | B60R 21/2338 |
| 2018/0281731 A1* | 10/2018 | Hotta | B60R 21/2035 |
| 2018/0354450 A1* | 12/2018 | Yamada | B60R 21/23138 |

* cited by examiner

FRONT AIRBAG FOR VEHICLES

CROSS-REFERENCE(S) TO RELATED APPLICATIONS

The present application claims priority to Korean Patent Application No. 10-2016-0173262, filed on Dec. 19, 2016, the entire contents of which is incorporated herein for all purposes by this reference.

BACKGROUND OF THE INVENTION

Field of the Invention

The present invention relates to an airbag located in front of a passenger of a vehicle and, more particularly, to an airbag which prevents a passenger from colliding with a structure, such as a crash pad or a center fascia, when an oblique crash occurs, and prevents injury to the passenger's neck or brain through rotation of the passenger's head.

Description of Related Art

As interest in passenger safety together with functionality and convenience in vehicles are increased, the importance of apparatuses regarding safety to protect passengers when an accident occurs has gradually increased. Particularly, among safety apparatuses to protect passengers, an airbag system is a basic protective apparatus which distributes the impact of a passenger in a vehicle crash.

Thereamong, a front airbag in the basic form of the airbag system is located in front of a passenger and configured to prevent the passenger from colliding directly with various structures in a vehicle during a crash, and to dampen impact energy transmitted from the outside.

However, the conventional airbag may not sufficiently protect a passenger and may thus cause direct collision of the passenger with a center fascia in an oblique crash, or may injury the passenger's neck and brain during a process of moving the passenger's head along the surface of the deployed airbag.

The information disclosed in this Background of the Invention section is only for enhancement of understanding of the general background of the invention and should not be taken as an acknowledgment or any form of suggestion that this information forms the prior art already known to a person skilled in the art.

BRIEF SUMMARY

Various aspects of the present invention are directed to providing an airbag which prevents a passenger from colliding with a structure including a crash pad or a center fascia, when an oblique crash occurs, and prevents injury to the passenger's neck or brain through the rotation of the passenger's head.

In accordance with the present invention, the above and other objects can be accomplished by the provision of a front airbag for vehicles including an airbag cushion including a rear panel located at the side of a steering wheel and a front panel located at the side of a passenger and having a shape corresponding to the shape of the rear panel, the rear panel and the front panel provided with protruding supports formed at both sides of the lower end portions thereof, a first tether connecting the central part of the front panel, corresponding to a loading position of the passenger's head, to an airbag housing, and second tethers connecting the lower end portion of the front panel, corresponding to a loading position of the passenger's chest, to the airbag housing and having a shorter length than that of the first tether.

The front airbag for vehicles may further include lower side panels respectively disposed between both protruding supports of the rear panel and the front panel, and connecting the protruding supports of the rear panel and the front panel to each other.

The front airbag for vehicles may further include a first sewing line connecting the front panel and the rear panel formed at a position distanced from the boundaries of the protruding supports in a direction towards the center of the front panel, and fracturing when a pressure having an intensity greater than a designated value is applied to the first sewing line.

The second tether may be a panel tether, and a coupled line of the second tether with the front panel may be formed in the vertical direction.

A plurality of second tethers may be provided in the width direction of the vehicle.

The front airbag for vehicles may further include a tear chamber located between the second tethers and the airbag housing, an actuator causing a portion of gas supplied to an airbag chamber through an inflator to the inside of the tear chamber, and a second sewing line penetrating the tear chamber in an undeployed state to connect the second tethers to the tear chamber and fracturing when gas is supplied to the inside of the tear chamber.

The front airbag for vehicles may further include a controller configured to control whether or not the actuator is operated and to detect whether or not the passenger is wearing a seat belt. The controller may control the actuator to not supply gas to the inside of the tear chamber when it is determined that the passenger is wearing the seat belt.

The front airbag for vehicles may further include a controller configured to control whether or not the actuator is operated and to detect whether or not the passenger is wearing a seat belt. The controller may control the actuator to supply gas to the inside of the tear chamber to fracture the second sewing line when it is determined that the passenger is not wearing the seat belt.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
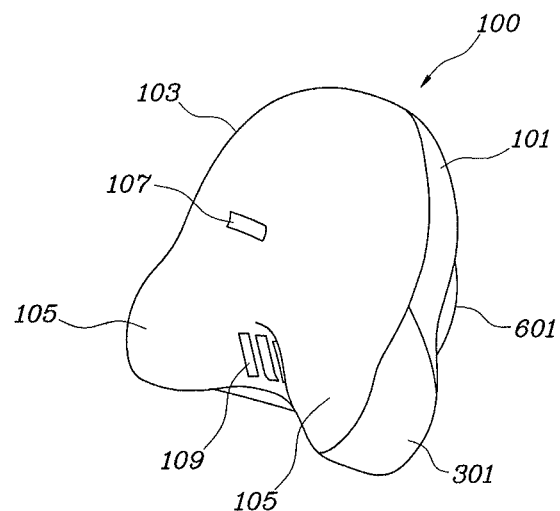
FIG. 1 is a perspective view of a front airbag for vehicles according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Figure 2:
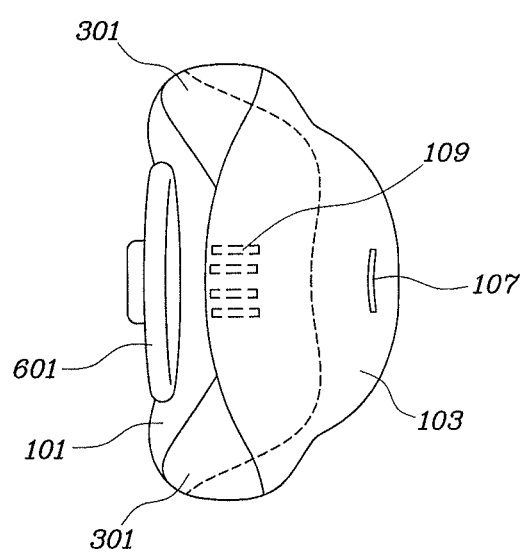
FIG. 2 is a plan view of the front airbag for vehicles according to an exemplary embodiment of the present invention.
Figure 3:
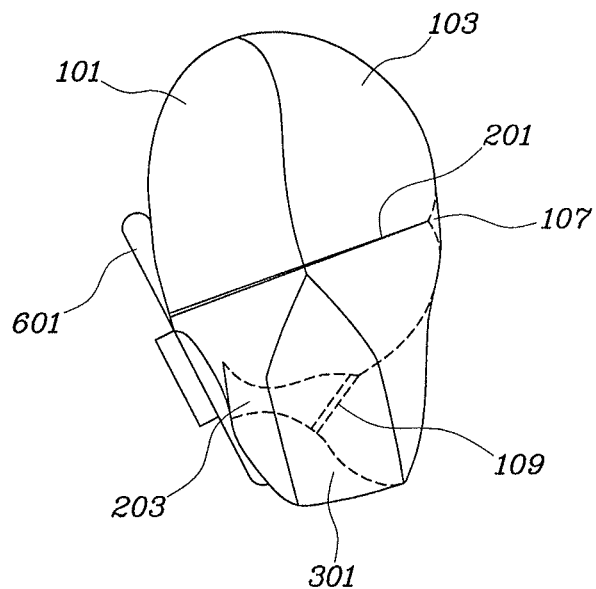
FIG. 3 and FIG. 4 are side views of the front airbag for vehicles according to an exemplary embodiment of the present invention.
Figure 4:
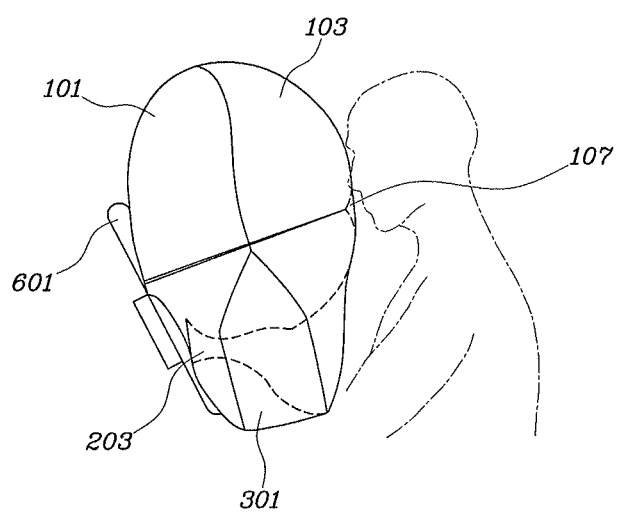

FIG. 1 is a perspective view of a front airbag for vehicles in accordance with an exemplary embodiment of the present invention, FIG. 2 is a plan view of the front airbag for vehicles in accordance with the embodiment of the present invention, and FIG. 3 and FIG. 4 are side views of the front airbag for vehicles in accordance with the embodiment of the present invention.

Figure 5:
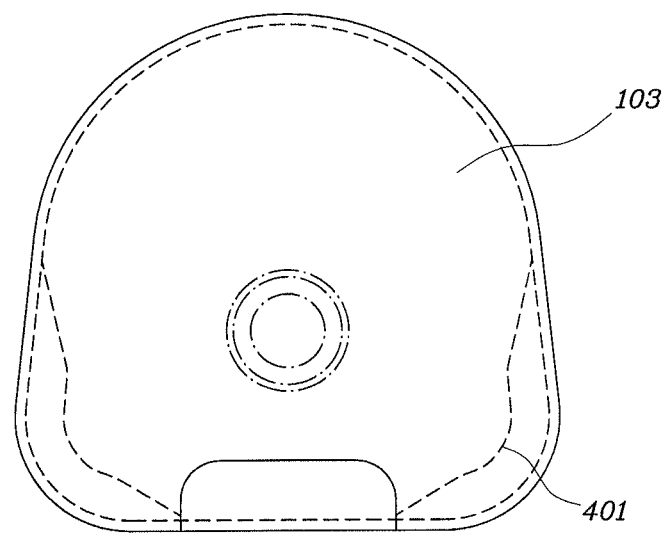
FIG. 5 is a plan view of a front panel of the front airbag for vehicles according to an exemplary embodiment of the present invention.
Figure 6:
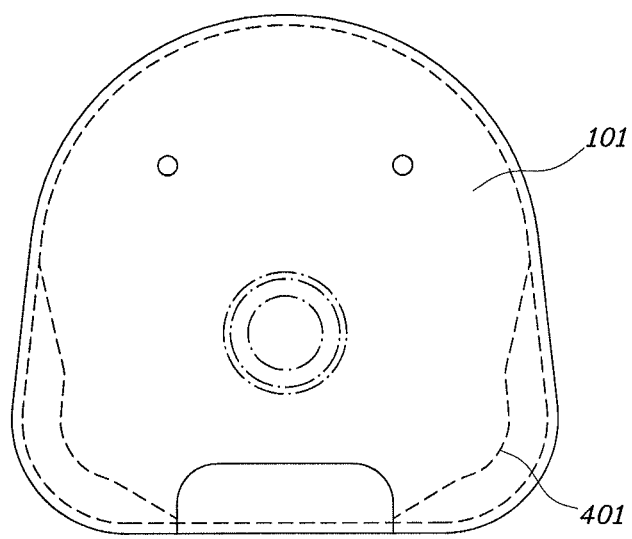
FIG. 6 is a plan view of a rear panel of the front airbag for vehicles according to an exemplary embodiment of the present invention.
Figure 7:
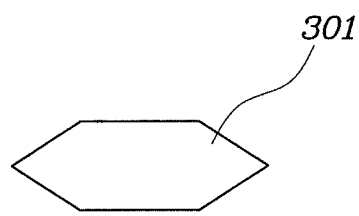
FIG. 7 is a plan view of a lower side panel of the front airbag for vehicles according to an exemplary embodiment of the present invention.

FIG. 5 is a plan view of a front panel of the front airbag for vehicles in accordance with the embodiment of the present invention, FIG. 6 is a plan view of a rear panel of the front airbag for vehicles in accordance with the embodiment of the present invention, and FIG. 7 is a plan view of a lower side panel of the front airbag for vehicles in accordance with the embodiment of the present invention.

Figure 8:
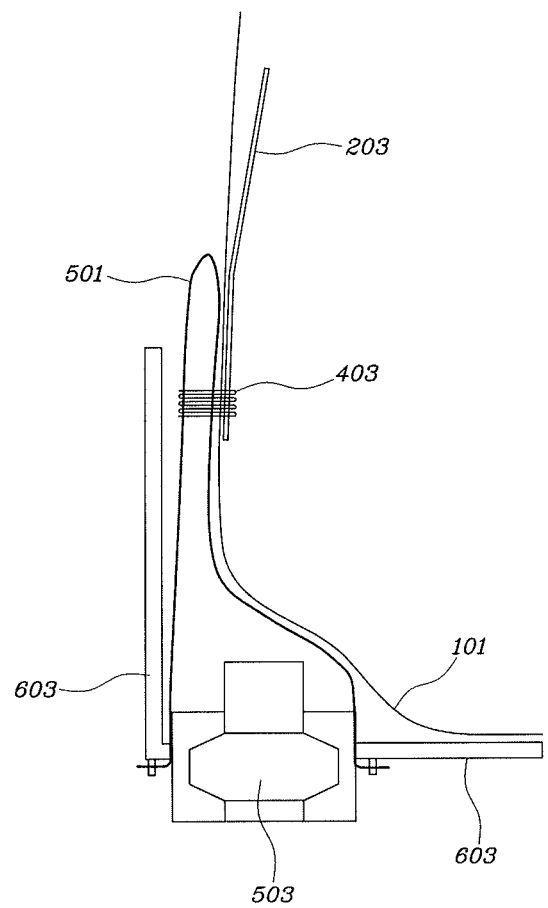
FIG. 8 and FIG. 9 are views illustrating a tear chamber of the front airbag for vehicles according to an exemplary embodiment of the present invention prior to and after operation.
Figure 9:
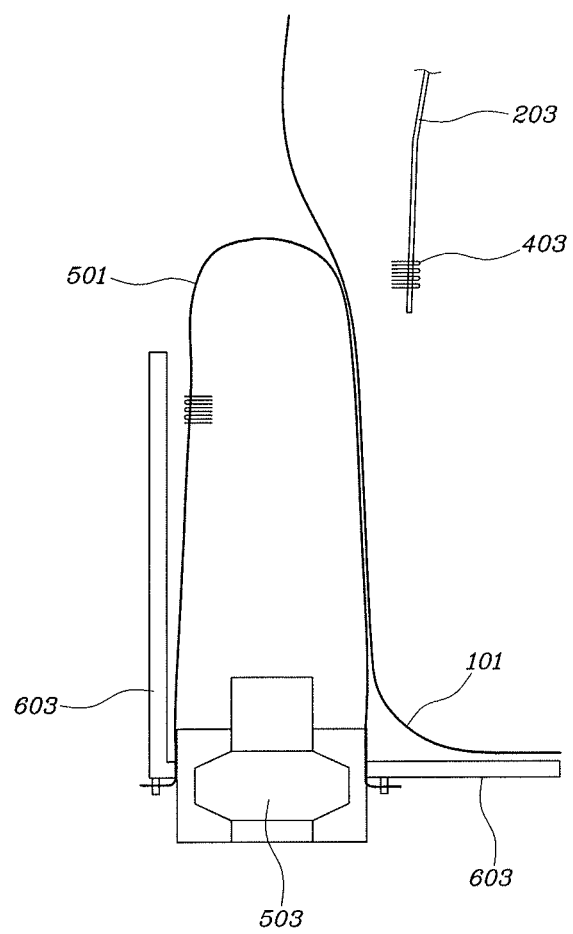

FIG. 8 and FIG. 9 are views illustrating a tear chamber of the front airbag for vehicles in accordance with the embodiment of the present invention prior to and after operation.

A front airbag for vehicles in accordance with the present invention includes an airbag cushion 100 including a rear panel 101 located at the side of a steering wheel 601, and a front panel 103 located at the side of a passenger having a shape corresponding to the shape of the rear panel 101; the rear panel 101 and the front panel 103 are provided with protruding supports 105 formed at both sides of the lower end portions thereof; a first tether 201 connecting the central part of the front panel 103, corresponding to a position 107 at which the passenger's head is located, to an airbag housing 603, and second tethers 203 connecting the lower end portion of the front panel 103, i.e., a position 109 at which the passenger's chest is located, to the airbag housing 603 and having a shorter length than that of the first tether 201.

In general, the average time taken to transmit crash energy to a passenger from when a vehicle crash occurs is approximately 100 milliseconds (ms) or less, i.e., impact is transmitted to the passenger within a very short time. An airbag should be deployed to protect the passenger before the crash energy is transmitted to the passenger, and, in the present case, the airbag should start to be deployed within 40 ms and be completely deployed within 100 milliseconds. Therefore, the speed at which gas is supplied to the inside of the airbag cushion 100 is very high and, thus, the deployment pressure of the airbag cushion 100 is very high.

In a crash, it is safer for the passenger to be protected by the airbag cushion 100 than to collide with a structure in the vehicle, but the present case is not absolute. The airbag cushion 100 may strike the passenger at a high deployment pressure during the deployment process and thus injure the passenger. However, when the airbag is not deployed, a more serious injury to the passenger occurs and, thus, many studies on the adjustment of the deployment pressure of the airbag or distribution of the deployment pressure of the airbag by changing an initial contact area between the airbag cushion 100 and the passenger have been carried out.

In accordance with the present invention, the deployment pressure of the airbag cushion 100 transmitted to the passenger is distributed by adjusting the shape of the airbag. With reference to FIG. 3 and FIG. 4, the deployment degree of a section of the airbag cushion 100, which the passenger's head first contacts, in the direction towards the passenger is increased through the first tether 201 and rapidly restricts displacement of the passenger's head before displacement of the passenger's head is increased, thus minimizing injury to the passenger due to breakage of the passenger's neck.

Further, the deployment degree of the airbag cushion 100 towards the passenger's chest is decreased through the second tethers 203 having a shorter length than that of the first tether 201 and, thus, the airbag cushion 100 is prevented from striking the passenger's chest during the deployment process of the airbag.

As exemplarily shown in FIG. 1, the protruding supports 105 are formed at both sides of the lower end portions of the rear panel 101 and the front panel 103 to first support both passenger's shoulders, thereby distributing the transmission of energy due to the deployment pressure of the airbag cushion 100 and crash during the process of loading the passenger on the airbag cushion 100.

The front airbag for vehicles in accordance with the present invention may further include lower side panels 301 respectively located between both protruding supports 105 of the rear panel 101 and the front panel 103, and thus connecting the protruding supports 105 of the rear panel 101 and the front panel 103 to each other.

The lower side panels 301 may increase the thickness of the airbag cushion 100 between the protruding supports 105 of the rear and front panels 101 and 103. Accordingly, the supporting force of both protruding supports 105 is increased, and thus a larger amount of energy may be distributed through the passenger's shoulders.

The front airbag for vehicles in accordance with the present invention may further include a first sewing line 401 connecting the front panel 103 and the rear panel 101, formed at a position distanced from the boundaries of the protruding supports 105 in a direction towards the center of the front panel 103, and fracturing when a pressure having an intensity greater than a designated value is applied thereto.

The protruding supports 105 may distribute energy by supporting the passenger's shoulders, but increases the volume of the airbag cushion 100 and may thus influence the deployment speed of the airbag cushion 100. Therefore, it is necessary to control the protruding supports 105 through selective deployment of the protruding supports 105.

In an exemplary embodiment of the present invention, during the process of loading the passenger on the airbag cushion 100 after deployment of the airbag cushion 100, when the passenger's body is relatively small or light the protruding supports 105 are not deployed, and when the passenger's body is relatively large or heavy the protruding supports 105 are deployed in promoting the distribution of crash energy.

In more detail, as exemplarily shown in FIG. 5 and FIG. 6, the first sewing line 401 is configured to fracture when a pressure having an intensity greater than a designated value is applied thereto and, thus, when a passenger, whose body is large or heavy, is seated in the vehicle, the first sewing line 401 fractures to deploy the protruding supports 105.

The second tether 203 may be a panel tether, and a coupled line of the second tether 203 with the front panel 103 may be formed in the vertical direction. A plurality of second tethers 203 may be provided in the width direction of the vehicle.

When a plurality of second tethers 203 having a panel shape is provided, the deployment direction of the protruding supports 105 may be bent in the direction towards the passenger. Thereby, capacity of the protruding supports 105 to support the passenger's shoulders may be improved.

The front airbag for vehicles in accordance with the present invention may further include a tear chamber 501 located between the second tethers 203 and the airbag housing 603, an actuator 503 causing a portion of gas supplied to an airbag chamber through an inflator to the inside of the tear chamber 501, and a second sewing line 403 penetrating the tear chamber 501 in the undeployed state to connect the tear chamber 501 to the second tethers 203 and fracturing when gas is supplied to the inside of the tear chamber 501.

With reference to FIG. 8 and FIG. 9, the second sewing line 403 penetrates the tear chamber 501 in the undeployed state and thus fixes the second tethers 203. Here, when gas is supplied to the tear chamber 501 through the actuator 503, the tear chamber 501 is deployed, the second sewing line 403 fractures, fixation of the second tethers 203 are released, and the deployment degree of the lower end portion of the airbag cushion 100 is increased. Accordingly, the deployment degree of the lower end portion of the airbag cushion 100 may be selectively adjusted.

The front airbag for vehicles in accordance with the present invention may further include a controller configured to control whether or not the actuator 503 is operated, and to detect whether or not the passenger is wearing a seat belt. The controller may control the actuator 503 to not supply gas to the inside of the tear chamber 501 when it is determined that the passenger is wearing the seat belt.

When the passenger is wearing a seat belt, the seat belt primarily restrains the passenger's upper body and, thus, an intensity of loading the passenger on the airbag cushion 100 is lowered. Here, to prevent the passenger from being struck by the deployment pressure of the airbag cushion 100, it is necessary to reduce the deployment degree of the lower end portion of the airbag cushion 100 using the second tethers 203 and, thus, the controller blocks the supply of gas to the tear chamber 501 using the actuator 503.

The front airbag for vehicles in accordance with the present invention may further include a controller configured to control whether or not the actuator 503 is operated and to detect whether or not the passenger is wearing a seat belt. The controller may control the actuator 503 to supply gas to the inside of the tear chamber 501 to fracture the second sewing line 403 when it is determined that the passenger is not wearing the seat belt.

When the passenger is not wearing a seat belt, the intensity of loading the passenger on the airbag cushion 100 is very high. In the present case, when the thickness of the airbag cushion 100 is not secured the passenger may directly collide with a vehicle structure including the steering wheel 601 or the crash pad. Therefore, the controller controls the actuator 503 to supply gas to the inside of the tear chamber 501 to fracture the second sewing line 403.

Accordingly, restraint on the deployment degree of the lower end portion of the airbag cushion 100 by the second tethers 203 is removed and, thus, the deployment degree of the lower end portion of the airbag cushion 100 may be increased, and a collusion between the passenger and the vehicle structure may be prevented.

As is apparent from the above description, a front airbag for vehicles may prevent injury to a passenger's neck or brain due to crash energy applied to the passenger in a crash. Further, crash energy transmitted to the passenger's chest or impact energy due to the deployment pressure of the airbag is distributed to the passenger's shoulders and, thus, injury to the passenger may be minimized.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others killed in the art to make and utilize various exemplary embodiments of the present invention, as well as various alternatives and modifications thereof. It is intended that the scope of the invention be defined by the Claims appended hereto and their equivalents.

What is claimed is:

1. A front airbag for a vehicle, the front airbag comprising:
    an airbag cushion including a rear panel located at a side of a steering wheel and a front panel located at a side of a passenger and having a shape corresponding to a shape of the rear panel, the rear panel and the front panel provided with protruding supports formed at a first side and a second side of lower end portions thereof;
    a first tether connecting a central part of the front panel, corresponding to a loading position of the passenger's head, to an airbag housing;
    a second tether connecting the lower end portion of the front panel, corresponding to a loading position of the passenger's chest, to the airbag housing and having a shorter length than a length of the first tether; and
    a first sewing line connecting the front panel and the rear panel, formed at a position distanced from boundaries of the protruding supports in a direction towards a center of the front panel, and configured for fracturing when a pressure having an intensity greater than a designated value is applied to the first sewing line.

2. The front airbag for the vehicle according to claim 1, further including lower side panels respectively located between both protruding supports of the rear panel and the front panel and connecting the protruding supports of the rear panel and the front panel to each other.

3. The front airbag for the vehicle according to claim 1, wherein the second tether is a panel tether, and a coupled line of the second tether with the front panel is formed in a vertical direction thereof.

4. The front airbag for the vehicle according to claim 3, wherein the second tether connecting the lower end portion of the front panel includes a plurality of second tethers is provided in a width direction of the vehicle.

5. The front airbag for the vehicle according to claim 1, further including:
   a tear chamber located between the second tether and the airbag housing;
   an actuator causing a portion of gas, supplied to an airbag chamber through an inflator, to an inside of the tear chamber; and
   a second sewing line penetrating the tear chamber in an undeployed state to connect the second tether to the tear chamber and configured for fracturing when gas is supplied to the inside of the tear chamber.

6. The front airbag for the vehicle according to claim 5, further including a controller configured to control whether the actuator is operated and to detect whether the passenger is wearing a seat belt,
   wherein the controller is configured to control the actuator to not supply gas to the inside of the tear chamber when it is determined that the passenger is wearing the seat belt.

7. The front airbag for the vehicle according to claim 5, further including a controller configured to control whether the actuator is operated and to detect whether the passenger is wearing a seat belt,
   wherein the controller is configured to control the actuator to supply gas to the inside of the tear chamber to fracture the second sewing line when it is determined that the passenger is not wearing the seat belt.

\* \* \* \* \*